United States Patent
Grinols

[15] 3,652,779
[45] Mar. 28, 1972

[54] UNDERGROUND CABLE PEDESTAL

[72] Inventor: Kenneth D. Grinols, 5354 Calle Florida, Siesta Key, Sarasota, Fla. 33581

[22] Filed: Apr. 21, 1971

[21] Appl. No.: 135,940

[52] U.S. Cl. ..................................174/38, 174/16 R, 174/51
[51] Int. Cl. ...........................................................H02g 9/02
[58] Field of Search ..................174/16 R, 37, 38, 44, 51, 60

[56] References Cited

UNITED STATES PATENTS

| | | |
|---|---|---|
| 2,916,539 | 12/1959 | Hamilton..................................174/38 |
| 3,033,912 | 5/1962 | Phillips....................................174/38 |
| 3,153,116 | 10/1964 | Phillips....................................174/38 |
| 3,162,718 | 12/1964 | Gunthel, Jr..............................174/38 |
| 3,435,124 | 3/1969 | Channell..................................174/38 |

Primary Examiner—Laramie E. Askin
Attorney—Watson, Cole, Grindle & Watson

[57] ABSTRACT

An underground cable pedestal comprising a lower tubular section partially embedded in the ground and having a grounding bar secured thereto as well as a grounding strap. A slideably removable cover section is provided for closing the top of the lower section; mating locking flanges being provided on both the cover and grounding bar to facilitate locking of the cover.

5 Claims, 4 Drawing Figures

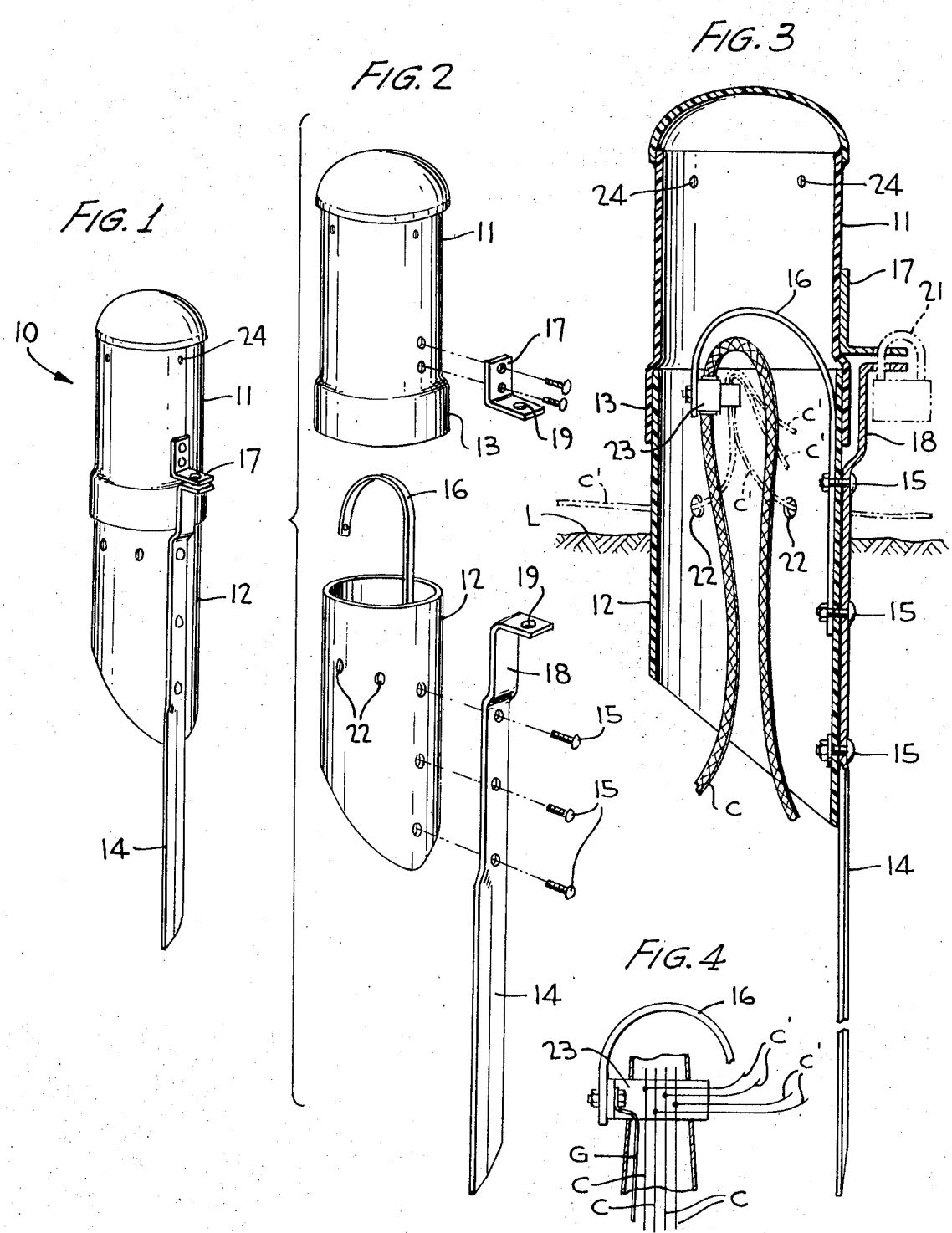
INVENTOR,
KENNETH D. GRINOLS

UNDERGROUND CABLE PEDESTAL

This invention relates generally to a cable pedestal for accommodating a subterranean cable extending upwardly therethrough from the ground and more particularly to a pedestal having an easily removable and lockable cover section.

As is customary during the installation of underground cable TV lines, as well as other electrical lines, a portion of the cable is extended upwardly above the ground in the vicinity of those homes along the side of a street or road which require service, such upwardly extended portion terminating within a hollow pedestal extended portion terminating within a hollow pedestal arrangement partially embedded within the ground and capable of being uncovered to facilitate both cable hookup and/or maintenance of the cable. Such pedestals are normally provided with some sort of grounding means for the ground wire of the cable may be of a nonmetallic composition in the interest of avoiding rapid deterioration and corrosion of the pedestal arrangement. However, these prior art devices are not without their many drawbacks, such as their complex or ineffective locking means, or lack thereof, the inability to readily open and replace the cover for the pedestal during service operations, and the difficulty of locking such a cover in place. The covers for many of the prior art pedestals therefore are designed to be threadedly secured in place which by itself is a drawback because of sand and other debris which accumulates in the threads, thereby preventing easy turning of the cover, not to mention the problems in opening the cover by reason of slight dimensional changes occuring during weather conditions of extreme heat or cold. It is therefore a principal object of the present invention to avoid these difficulties by providing a pedestal arrangement with a cover which is easily and quickly removable and which may be locked in place, and being characterized by a minimum number of parts of simple design, easy to manufacture and economical, while at the same time serving the purpose of grounding the cable and simply supporting it within the pedestal.

Another object of this invention is to provide such a cable pedestal having a cover section coupled to a lower, hollow tubular section, the open end of the cover having a peripheral enlarged rim portion, thereby snugly embracing the lower section while the cover is in place.

A further object of this invention is to provide such a pedestal wherein a grounding bar is secured to the lower section and a grounding strap is secured to the bar, the bar having a locking flange and the cover being provided with a locking flange so as to facilitate a convenient locking of the sections.

A still further object of this invention is to provide such a pedestal wherein the grounding strap serves both as a ground lead from the ground wire of the cable as well as a support for the cable extending from the ground upwardly through the pedestal.

Other objects, advantages and novel features of the invention will become apparent from the following detailed description of the invention when considered in conjunction with the accompanying drawings wherein:

FIG. 1 is a perspective view of the assembled pedestal in accordance with the present invention;

FIG. 2 is a perspective exploded view showing the various parts of the pedestal;

FIG. 3 is a vertical sectional view of the pedestal, and

FIG. 4 is a detailed showing of a junction location between the cable wires and the wires leading from the pedestal.

Turning now to the drawings wherein like reference characters refer to like and corresponding parts throughout the several views, there is shown in FIGS. 1 and 2 a perspective of a pedestal identified as 10 having basically a domed cover section 11 and a tubular open-ended lower section 12. Cover 11 is provided with a slightly enlarged peripheral rim portion 13 at which the inner diameter of the cover is slightly in excess of the outer diameter of the lower section 12. In this way, the cover may be conveniently and quickly placed over the upper open end of the lower section and be snugly embraced at the rim portion so as to insulate the interior of the pedestal from the weather elements.

The lower section 12 is embedded partially beneath the ground level L and has a tapered bottom opening to facilitate easy lowering into the ground. A cable TV, telephone or electrical wire cable C will have already been laid beneath the ground level parallel to the road or street along which the buildings to be serviced are situated. As clearly seen in FIG. 3, a portion of the underground cable C is brought up through the lower section 12 and is conveniently spliced as shown in FIG. 4. Such an arrangement may, of course, be duplicated at another location down the street or roadway for other buildings requiring service.

The lower section is provided with a metallic grounding bar 14 of rigid construction and is secured parallel to the longitudinal axis of the lower section by means of suitably provided fasteners 15. This grounding bar acts not only as a ground lead extension for the ground wire of the cable but also serves to stabilize the pedestal in the ground. Secured to the interior of the lower section is a grounding strap 16 suitably flexible so as to be bent in a direction toward the cable extension for the purpose of both supporting same and acting as a ground lead for ground wire G as shown in detail in FIG. 4. The other end of the cable is, of course, secured to the grounding bar through the lower section wall by means of a pair of fasteners 15.

A locking flange 17 is provided adjacent rim portion 13 on the cover 11 and, near the end of the grounding bar 14, a locking flange 18 is also provided as an extension thereof, each of such flanges having aligned apertures 19 therein to accommodate a padlock 21 shown in phantom in FIG. 3 of the drawing. Also, the locking flange 18 on the bar 14 is reversely bent as shown so as not to interfere with rim portion 13 after the cover 11 is lowered in place.

Feed-through holes 22 are provided in lower section 12 through which an individual service cable c' may be fed toward one of the homes or buildings to be serviced. In this embodiment, four of such holes 22 are provided although it should be understood that any number of holes may be provided depending on the type of cable C used. In this case, each of the cables c' is lead from its respective cable line C within the plate 23 in some conventional manner and thereafter fed through its respective feed hole 22. In this way, any need for directing these feed lines through the bottom portion of the pedestal is substantially avoided.

Furthermore, it should be noted that air vent apertures 24 are provided in the cover 11 so that the condensation or accumulation of moisture within the pedestal may be conveniently aired therethrough.

The cover 11 and lower section 12 may be formed of a suitable plastic material which is resistant to greases and oils, water, sunlight, extreme temperature conditions, and strong acids and alkalis. Such a plastic which has proven satisfactory for the purpose is known as A.B.S., which is acrylonitrile-butadiene-styrene. Also, the polyvinyl chloride or a polystyrene plastic may be used for the purpose. Furthermore, the grounding strap 16 may be of a suitable zinc or lead alloy composition so that is may be conveniently bent, for example, in the shape as shown in FIGS. 2 and 3 of the drawings.

From the foregoing it can be seen that a simply constructed and assembled yet highly economical and efficient pedestal arrangement has been devised for television as well as telephone and power cables installed beneath the ground level with a portion thereof extending upwardly through the ground at which a plurality of service lines may be connected with the houses or buildings to be serviced. The cover section of this pedestal may be quickly and easily coupled with the pedestal lower section and simply locked in place. The grounding strap and grounding bar are designed for easy assembly and serve not only as a ground extension for the ground wire of the cable but also as a support; the grounding bar serving to support the pedestal itself and the grounding strap serving to support the extended cable portion within the pedestal. Feed apertures for the service cables are conveniently provided in the pedestal lower section and ventilation holes are located in the cover section for venting any accumulation of moisture from within the pedestal. The swaged or enlarged rim section of the cover permits a snug fit between the two sections, thereby insulating the interior pedestal from weather elements, dust, grease, etc. Also, the ability of the cover to be slipped on and off the pedestal lower section offers an advantage over the threaded-type connection which sometimes warps over long periods of use and only collects dust and dirt particles about the threads, thereby making it difficult to effectively couple such sections.

Obviously, many modifications and variations of the present invention are possible in the light of the above teachings. It is therefore to be understood that within the scope of the appended claims the invention may be practiced otherwise than as specifically described.

What is claimed is:

1. A cable pedestal for a subterranean cable extending upwardly therethrough from the ground comprising a tubular open-ended lower section and an upper cover section removably coupled with the upper end of said lower section, a grounding bar secured to said lower section, and a grounding strap being secured to said bar, the axis of said bar being parallel to the axis of said lower section, and the upper end of said bar having a locking flange thereon, said cover also having a locking flange secured thereto with each of said flanges having aligned apertures therein so as to facilitate the locking of said cover to said lower section.

2. The pedestal according to claim 1 wherein one end of said cover is dome-shaped and the other end thereof has a peripheral enlarged rim portion of such a dimension as to snugly embrace said lower section upper end, said cover locking flange being located adjacent said rim portion, and said grounding bar adjacent said bar locking flange being reversely bent away from said lower section in the vicinity of said rim portion so as to permit the said cover rim portion to snugly embrace said lower section.

3. The pedestal according to claim 2 wherein said cover section is provided with air vent holes.

4. The pedestal according to claim 2 wherein said grounding strap is secured to said bar along the interior of said lower section, said strap serving not only as a ground lead for a ground wire of said cable but also serving to support that portion of the cable extending upwardly therethrough from the ground.

5. The pedestal according to claim 4 wherein said lower section is provided with feed holes therein through which a service wire of the cable may extend.

* * * * *